United States Patent [19]

Lazes

[11] Patent Number: 4,617,823
[45] Date of Patent: Oct. 21, 1986

[54] HYDRO PRESSURE THREAD TESTER

[76] Inventor: Richard J. Lazes, 2748 Orchid St., New Orleans, La. 70119

[21] Appl. No.: 698,030

[22] Filed: Feb. 4, 1985

[51] Int. Cl.⁴ ............................................. G01M 3/28
[52] U.S. Cl. ......................................... 73/46; 73/49.5
[58] Field of Search ................. 73/46, 49.1, 49.5, 49.6

[56] References Cited

U.S. PATENT DOCUMENTS

| 2,241,526 | 5/1941 | Rosenkranz | 73/46 X |
|---|---|---|---|
| 2,246,885 | 6/1941 | Jones | 73/46 X |
| 2,663,183 | 12/1953 | Huhn | 73/46 |
| 2,695,632 | 11/1954 | Brock | 73/46 X |
| 3,034,339 | 5/1962 | Gawlik | 73/49.5 X |
| 3,653,254 | 4/1972 | Simon | 73/46 |
| 4,132,111 | 1/1979 | Hasha | 73/46 |
| 4,152,926 | 5/1979 | Hasha | 73/46 |

Primary Examiner—Stewart J. Levy
Assistant Examiner—Joseph W. Roskos
Attorney, Agent, or Firm—George A. Bode

[57] ABSTRACT

An apparatus for hydrostatically testing the pipe threads on the end of a length of pipe onto which a coupling is adapted comprising a cylindrical body member that is inserted inside the end of the pipe and having attached thereto a hydraulically activated pressure resistant first seal that contacts a plurality of second seals arranged annularly of the cylindrical body member between its flange and the cylindrical body whereby the second annular seals are forced outwardly and into contact with the inner surface of the pipe being tested in order to seal off the interior of the pipe so as to isolate test fluid introduced under pressure to the area surrounding the connection between the pipe and the cylindrical body member, a cylindrical nipple like pressure resistant third seal arranged at the opposite end of the cylindrical body member that is screwed into the exposed interior threads of the coupling, a fluid passageway that is arranged in the cylindrical body member for introducing a testing fluid under pressure into the annulus between the hydraulically activated first seal and the cylindrical nipple like plug.

7 Claims, 3 Drawing Figures

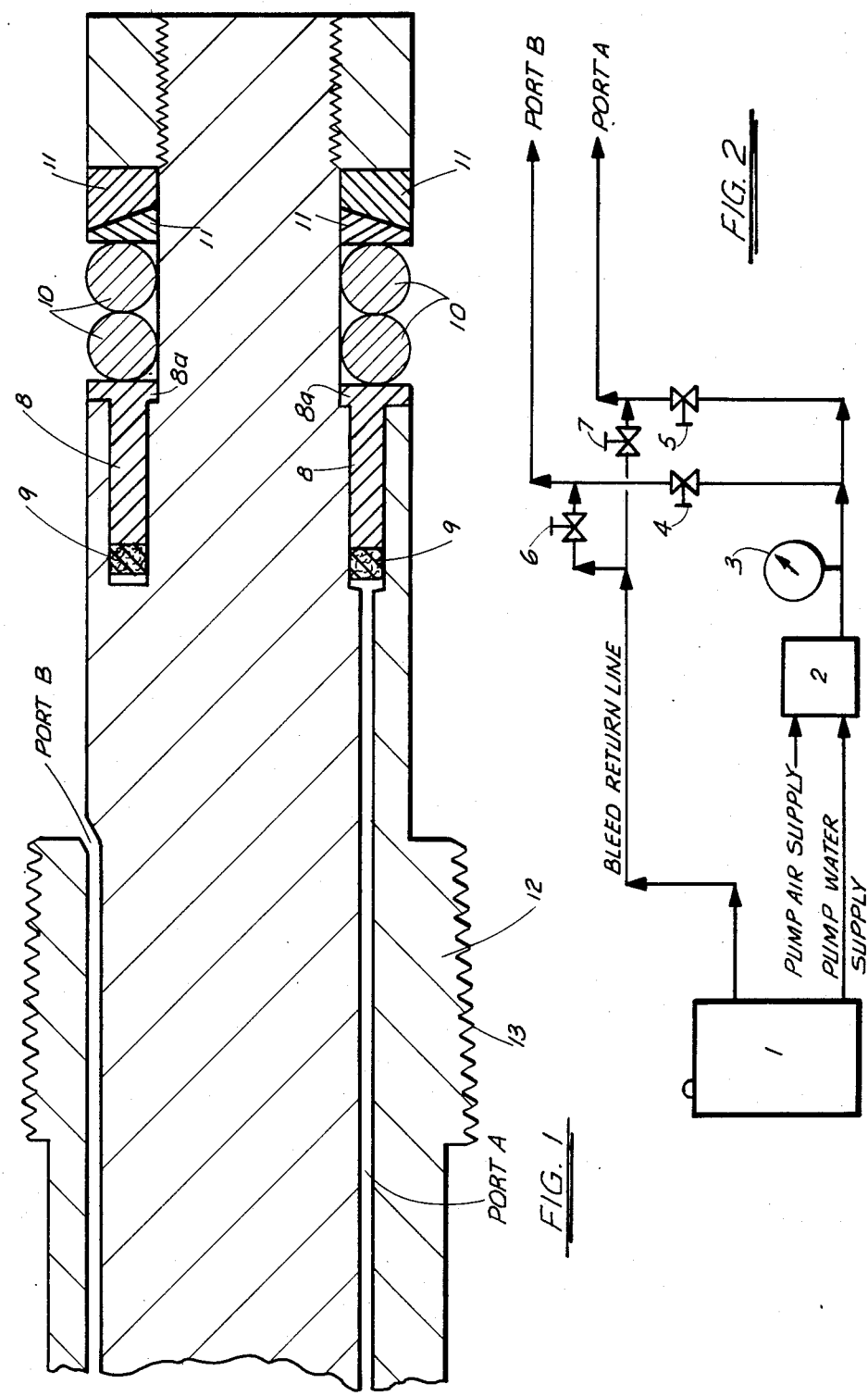

HYDRO PRESSURE THREAD TESTER

BACKGROUND OF THE INVENTION

1. Field of the Invention

The current invention relates to an apparatus employed to test for leaks between the external threads on the pin ends of pipe and the internal threads on the coupling when these two parts are screwed together. This relates to an apparatus for testing a pipe joint by confining fluid under pressure to the connection area.

2. General Background

In the oil and gas production industry, stringing tubing section of threaded pipe are joined end to end, i.e., pin to box end, to convey fluids. It is desirable that the joints be strong and of tight fit. It is common practice, in the oil and gas industry, to plug off the ends of each particular joint, (after the couplings have been screwed on one pin end of each joint) and to fill the inside of the pipe with a fluid under high pressure to check for leaks behind the collar. Evidence of any leaks, when pressured up to a standardized test pressure is indication that either the external threads on the pin end or the internal threads on the coupling were improperly machined and thus not mating properly, or that they may have not been screwed together with adequate torque. This test procedure is followed to simulate actual downhole conditions when there is pressure exerted on the connections.

This procedure is very inefficient due to the need to fill up the entire inside of the full length of the tubing with water. This is time consuming. There is also the potential for damage to the pin end of the pipe caused by the test plug that is screwed onto this end to entrap the liquid inside the pipe. The procedure is also very dangerous due to the high pressure and high volume of liquid which sometimes causes the test plugs to blow out the ends.

PRIOR ART STATEMENT

U.S. Pat. No. 2,663,183 issued to F. Huhn and is entitled "Tube Testing Apparatus." This patent discloses a tester adapted to be screwed into the open end of a pipe coupling which is in turn screwed on to the threaded end of a tube or well casing.

U.S. Pat. No. 2,241,526 issued to M. Rosenkranz and is entitled "Pipe Joint Tester" and discloses an apparatus for testing a pipe joint by confining fluid under pressure to the joint area. This device also comprises, as with the Huhn '183 patent, a tester member having seal members spaced apart so as to seal off the area of the pipe connection to be tested and, after the seal is effected, providing a testing fluid internally to the joint through a passageway arranged axially in the body member.

U.S. Pat. No. 2,246,885 issued to G. H. Jones and is entitled "Pipe Joint Tester" and discloses a device for testing the joint by introducing interiorly of the joint to be tested fluid under pressure which is confined solely to the joint area.

U.S. Pat. No. 2,695,632 issued to M. C. Brock and is entitled "Coupling Tester" and discloses an apparatus for testing tool joints providing a mandrel with an axial bore closed at one end, sealing members to engage the interior wall of the pipe proximate either end thereof and laterally communicating ports in the mandrel such that is communicates test fluid to the connections securing the tool joint to the pipe.

U.S. Pat. No. 3,034,339 issued to P. A. Gawlik and is entitled "Tool For Detecting Pipe Leaks."

U.S. Pat. No. 4,136,552 issued to M. M. Hasha and is entitled "Leak Testing Method And Apparatus For Tubular Members And Packer Means Therefor."

U.S. Pat. No. 4,152,926 issued to M. M. Hasha and is entitled "Method And Apparatus For Testing The Connections Between Pipe Segments."

U.S. Pat. No. 3,653,254 issued to T. A. Simon and is entitled "Leak-Testing Internal Seals In Pipe Joints."

It is an objective of this invention to reduce the volume of liquid used in this procedure by blocking off the inside of the tube with an hydraulic sealing means that makes an interior seal inside the tube of the pipe and prevents the liquid from running down the entire length of the pipe. Thus, with the apparatus of the present invention it is possible to create a test pressure inside the coupling and to check for leaks behind the collar without filling up the entire pipe with the test liquid. Since there is no need for a test plug to be screwed on the exposed pin end of the pipe, this invention eliminates the possibility of damage to the exposed pin end. Since there is a greatly reduced volume of water employed in this testing procedure, the danger of blowing out the test plug is eliminated. Since only a small fraction of liquid (compared to conventional pressure testing) is used this procedure is much more efficient and takes a greatly reduced amount of time to complete.

Although there is the considerable prior art discussed above evolving around devices that seek to achieve the same results as the present invention, the apparatus of the invention present invention is the only device that has the capability of presure testing various different weights of pipe and which works on pipe that has ovality in it, which is commonly found on all oilfield casing the tubing in field conditions.

BRIEF DESCRIPTION OF THE PRESENT INVENTION

The present invention is comprised of an hydraulically activated rubber sealing means that is inserted through the coupling and into the pipe that is assembled to the coupling. This means forms an interior seal inside the tube of the pipe. Connected to this means is a test plug that is screwed directly into the interior threads of the coupling. There is a small tube that is used to introduce a liquid, under high pressure, into the annulus created between the internal seal of the invention and the test plug that is screwed into the open coupling end. Liquid is then introduced through this port and pumped with a high pressure pump into the annulus. This procedure produces a stress on the connection between the external pipe threads and the internal coupling threads. The operator then checks for leaks between the pipe and coupling to see if the threaded surfaces mate properly and if the connection is adequate to withstand the pressures that might be exerted upon it under actual condition in an oil well.

BRIEF DESCRIPTION OF THE DRAWINGS

For a further understanding of the nature and objects of the present invention, reference should be had to the following detailed description taken in conjunction with the accompanying drawings, in which like parts are given like reference numerals and wherein:

FIG. 1 is an elevational view partly in section of the preferred embodiment of the apparatus of the present invention;

FIG. 2 is a schematic of the present invention connected to a high pressure pump which is driven by an air compressor;

DETAILED DESCRIPTION OF THE PREFERRED EMBODIMENT

Figure 3:
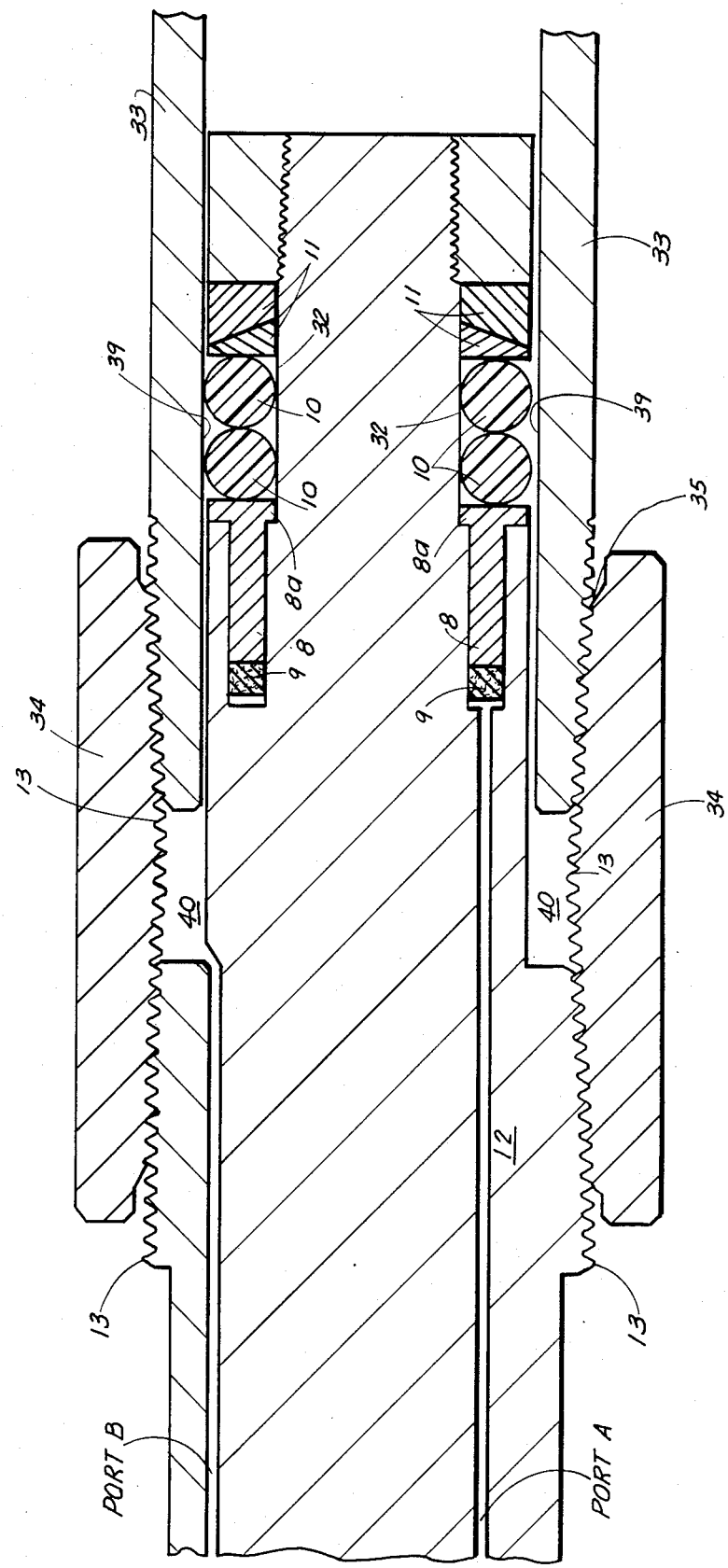
FIG. 3 is an elevational view partly in section of the preferred embodiment of the apparatus of the present invention in its operational state wherein it is inserted inside a coupling and pipe that are already assembled together.

The apparatus of the present invention 12 is screwed into the open end of the coupling 34 as shown in FIG. 3 in such a way that a sealing means is formed the external threads 13 of apparatus 12 engage with the interior threads 35 of the coupling 34 to make a metal to metal seal with the coupling 34. Bleed valve 7 (FIG. 2) and isolation valve 4 are in the closed position. Water from tank 1 is pressurized by pump 2 (a conventional pressure gauge 3 is provided to measure the water pump output) and flows through isolation valve 5 and the hose connected to port A. This water, under pressure, activates a first sealing means or annular piston 8 (FIG. 1) which puts a thrust or compression load on the seal rings 10 at its piston head or flanged end portion 8a. Piston 8 is sealingly enclosed in its chamber by rubber seal rings 9. These seal rings 10 or second seal means are squeezed out by the fluid pressure and contact the inside wall 32 of the reduced diameter portion of apparatus 12 and the inside wall 39 of the pipe 33 thus creating a plug to keep the water (which is later introduced through port B into the annulus 40 between the device and the coupling) from running down the inside of pipe 33. Anti-extrusion ring 11 is squeezed outwardly in order to come in contact with the interior wall 39 of pipe 33. This device 12 thus prevents pliable sealing rings 10 from extruding down the length of pipe 33 and gives apparatus 12 the versatility of being able to pressurize pipes of varying weights and ones that are not perfectly round.

Isolation valve 5 is then closed in order to lock seals 10 in the loaded positon. The third sealing means or power tight connection between pipe 33 and coupling 34 (external torque means are applied to ensure a "power" tight connection) is now pressure tested by closing bleed valve 6 and then opening isolation valve 4 allowing the pressurized water to flow from the hydraulic pump 2 through the hose connected to port B and into the annulus 40 created between apparatus 12 and the inside of the coupling 34.

Once this pressure has been raised to the proper test pressure, the operator can check for any leaks around the connection between pipe 33 and coupling 34. Any leaks caused by improper mating of the external pipe threads and the internal coupling threads can be easily detected. After the test is completed, bleed valves 6 and 7 are opened to relieve the pressured water from the annulus 40. After the pressure has been neutralized, apparatus 12 is removed from pipe 33 being tested by unscrewing the unit from the coupling 34.

What is claimed as invention is:

1. An apparatus for hydrostatically testing the pipe threads on an end of a length of pipe onto which a coupling is threadably adapted comprising: a cylindrical body member that is inserted inside said end of said pipe and having provided therein a hydraulically activated pressure resistant first sealing means that contact a plurality of second sealing means arranged annularly of said cylindrical body member between a flanged portion of said first sealing means and the first end portion of said cylindrical body member, whereby said second annular sealing means are forced outwardly and into contact with the inner surface of said pipe being tested, thereby sealing off the interior of said pipe so as to isolate a test fluid introduced under pressure to the area surrounding the connection between said pipe and said cylindrical body member, a cylindrical nipple-like third pressure resistant sealing means arranged at the opposite end of said cylindrical body member that threadably engages the exposed interior threads of said coupling, and a fluid passageway provided in said cylindricaal body member for introducing said testing fluid under pressure into said annulus created between said hydraulically activated first sealing means and said cylindrical nipple-like third sealing means.

2. The apparatus of claim 1, further comprising means for confining said test fluid under pressure to the connection area between said pipe and said cylindrical body member.

3. The apparatus of claim 1, wherein said third sealing means comprises a metal-to-metal seal formed by the external threads of said apparatus threadably engaging the interior threads of said coupling.

4. The apparatus of claim 1, wherein said pressure testing device creates an internal seal on the interior surface of said pipe whereby said testing fluid under pressure is confined to said connection area.

5. The apparatus of claim 1, wherein said means for admitting pressurized fluid into the interior of said cylindrical body member includes a port extending longitudinally through said cylindrical body member and a passageway connecting said port to a source of pressurized fluid.

6. An apparatus for hydrostatically testing the pipe threads on an end of a length of pipe onto which a coupling is threadably adapted comprising: a cylindrical body member that is inserted inside said end of said pipe and having provided therein a hydraulically activated pressure resistant first sealing means that contact a plurality of second sealing means arranged annularly of said cylindrical body member between a flanged portion of said first sealing means and the first end portion of said cylindrical body member, whereby said second annular sealing means are forced inwardly and outwardly and into contact with the inner surface of said pipe being tested, thereby sealing off the interior of said pipe so as to isolate a test fluid introduced under pressure to the area surrounding the connection between said pipe and said cylindrical body member, a cylindrical nipple-like third pressure resistant sealing means arranged at the opposite end of said cylindrical body member that threadably engages the exposed interior threads of said coupling, and a fluid passageway provided in said cylindrical body member for introducing said testing fluid under pressure into said annulus formed between said hydraulically activated first sealing means and said cylindrical nipple-like third sealing means.

7. An apparatus for hydrostatically testing the pipe threads on an end of a length of pipe onto which a coupling is threadably adapted comprising: a cylindrical body member that is inserted inside said end of said pipe and having provided therein a hydraulically activated pressure resistant first sealing means that contact a plurality of second sealing means arranged annularly of said cylindrical body member between a flanged portion of said first sealing means and the first end portion of said cylindrical body member, whereby said second annular sealing means are forced inwardly and outwardly and into contact with the inner surface of said pipe being tested, thereby sealing off the interior of said pipe so as to isolate a test fluid introduced under pressure to the area surrounding the connection between said pipe and said cylindrical body member, a cylindrical nipple-like third pressure resistant sealing means, arranged at the opposite end of said cylindrical body member that threadably engages the exposed interior threads of said coupling, and a fluid passageway provided in said cylindrical body member for introducing said testing fluid under pressure into said annulus formed between said hydraulically activated first sealing means and said cylindrical nipple-like third sealing means.

\* \* \* \* \*